United States Patent [19]

Bertrand

[11] 4,088,223

[45] May 9, 1978

[54] AMPLITUDE AND FREQUENCY ADJUSTABLE VIBRATION GENERATOR

[75] Inventor: Olivier Philippe Bertrand, Paris, France

[73] Assignee: Roger Brigolle, Leguillon, France

[21] Appl. No.: 727,561

[22] Filed: Sep. 28, 1976

[30] Foreign Application Priority Data

Oct. 1, 1975 France ................................ 75 30003

[51] Int. Cl.$^2$ ................................ B65G 27/32

[52] U.S. Cl. ................................ 198/761; 198/766

[58] Field of Search ................ 198/761, 762, 766, 767

[56] References Cited

U.S. PATENT DOCUMENTS

| | | | |
|---|---|---|---|
| 3,169,108 | 2/1965 | Dietert | 198/761 |
| 3,236,381 | 2/1966 | Poynter | 198/761 |
| 3,253,700 | 5/1966 | Allen et al. | 198/766 |
| 3,273,698 | 9/1966 | Allen et al. | 198/766 |
| 3,348,664 | 10/1967 | Renner | 198/761 |
| 3,528,541 | 9/1970 | Barton et al. | 198/766 |
| 3,547,252 | 12/1970 | Brown et al. | 198/761 |
| 3,557,936 | 1/1971 | Van Tuyl | 198/766 |
| 3,567,012 | 3/1971 | Mendoza | 198/761 |
| 3,750,866 | 8/1973 | Musschoot | 198/767 |
| 3,924,730 | 12/1975 | Brown | 198/761 |

FOREIGN PATENT DOCUMENTS

| | | | |
|---|---|---|---|
| 228,698 | 7/1963 | Germany | 198/766 |
| 2,316,622 | 1/1974 | Germany | 198/766 |
| 309,884 | 9/1971 | U.S.S.R. | 198/761 |

*Primary Examiner*—Evon C. Blunk
*Assistant Examiner*—Richard K. Thomson
*Attorney, Agent, or Firm*—William Anthony Drucker

[57] ABSTRACT

This vibration generator intended more particularly for impressing a vibratory motion to vibrating apparatus such as handling circuits and treatment stations for loose materials and products comprises an excitation eccentric rotatably driven from a motor and adapted, during at least one fraction of its stroke, to co-act with a roller lined with resilient material mounted in a fixed position on the apparatus, the axis of rotation of this eccentric being coupled to means controlling its movement substantially in the direction towards the apparatus. Thus, the amplitude and frequency of the vibratory motion can be modified while in operation, either manually or automatically.

12 Claims, 8 Drawing Figures

AMPLITUDE AND FREQUENCY ADJUSTABLE VIBRATION GENERATOR

BACKGROUND OF THE INVENTION

1. Field of the Invention

This invention relates to a vibration generator, designed more particularly for energizing vibrating apparatus of the type employed in handling circuits and treatment stations for bulk and loose materials or products, such as vibrating feeders or conveyors, feeders, screens, sieves, etc. It is known that when a vibratory motion is impressed on a resilient mass, the latter vibrates at an excitation frequency *fe* with a predetermined amplitude *a* depending on the applied torque in the case of an out-of-balance excitation system.

The apparatus assumes a resonance condition when the ratio: $fe/fp = 1$, wherein *fp* is the inherent frequency of the resilient mass.

Under these conditions, three states have to be taken into account:

I. Below the resonance state, we have: $fe/fp < 1$

II. At the resonance state, we have: $fe/fp = 1$

III. Above the resonance state, we have: $fe/fp > 1$

2. Description of the Prior Art

This led manufacturers to propose three specific groups of vibration generators. A first type comprising a connecting-rod and crankshaft system operates well below resonance level and provides wide amplitudes at low frequency values; it is utilized chiefly for transporting products of low apparent density. Another type operates close to resonance frequency, either slightly below (sub-critical regime) or slightly above (super-critical regime) this frequency. Under sub-critical regime the vibrated resilient mass admits a variable load on the transporting trough, shoot or chute without entailing a substantial amplitude modification. On the other hand, under super-critical regime a variation in the trough load is attended by a reduction in the vibration amplitude and therefore in the apparatus output. This second type of apparatus comprises both eccentric-operated and electromagnet-operated vibration generators. In electromagnet-operated vibration generators the power consumption is relatively low since it takes advantage of the resonance power. More particularly, the electromagnet excitation system is particularly adapted for adjusting the vibration amplitude during the operation of the apparatus or in other words, for adjusting the apparatus output, but if large outputs are contemplated the generator may become unduly cumbersome for, since the rate of propagation of the material in the chute is inversely proportional to the chute vibration frequency, it would be necessary for obtaining relatively high outputs to use a frequency of less than 50 Hertz, which is obviously scarcely feasible under normal service conditions. Finally, vibration generators of the third type operate well beyond resonance level and have therefore a stable output attended however by the inconvenience of requiring an excitation power consumption of two to three times the energy necessary for maintaining the motion due to the necessity of passing rapidly through the resonance zone. In general, to vary the output, one is led to stop the vibration generator. Now, in certain cases it may be very useful to control this change during the operation of the apparatus by using manual or automatic servo means for varying the output as a function of a variable factor from an apparatus located downstream. To vary an output during operation, various factors or parameters may be controlled, such as the frequency itself (damping the resilient mass), the excitation frequency (notably in the case of out-of-balance excitation systems), but due to their position beyond the resonance frequency, only one fraction of the range of output adjustments can be obtained. Apparently, the most advantageous method consists in varying the amplitude during the operation of the apparatus, so that a range from zero to maximum output can be attained continuously. This last-mentioned solution was actually choosen by the Applicant, considering the fact that the first two solutions led to scarcely reliable and rather inaccurate constructions. Means for varying the amplitude of vibration during service have already been proposed, notably for out-of-balance generators, but this construction is particularly complicated from the mechanical standpoint.

SUMMARY OF THE INVENTION

It is a principal object of the present invention to avoid the above-described inconveniences characterizing prior art vibration generators by providing an improved mechanical structure for vibration generators which is adapted to be easily adjusted during operation for modifying the vibration amplitude and frequency while delivering a relatively high energizing torque.

With this object in view, it occurred to the Applicant that the rigid connection utilized in known mechanical excitation systems of the eccentric type between the vibration generator and the apparatus to be vibrated can be suppressed so as to move the vibration generator towards and away from the apparatus to be vibrated during operation, whereby the amplitude of the vibratory motion imparted to the apparatus can be varied at will from zero value to a maximum value. For this purpose, the vibration generator according to this invention consists of an excitation or energization eccentric rotatably driven from a motor and adapted, during at least one fraction of its stroke, to co-act with a roller of resilient material mounted in a fixed position on the apparatus to be vibrated, the axis of rotation of the excitation eccentric being coupled to means controlling its movement substantially in the direction towards the apparatus.

As illustrated in the basic diagram of FIG. 1 of the attached drawings the roller R is urged to its position of equilibrium $R_0$ by spring means (not shown) and adapted to oscillate with a reciprocating motion about this position of equilibrium. When the eccentric member is in position $E_1$, the roller R is moved to a position $R_1$ remotest from its position of equilibrium $R_0$, i.e. at a distance *a* therefrom, and during the eccentric movement the roller will assume by oscillating a position $R'_1$ symmetrical in relation to the position of equilibrium $R_0$, whereby the roller, during the eccentric rotation, will be reciprocated with an amplitude 2*a*. When the eccentric is moved away from the roller R, the latter is moved through a shorter distance from its position of equilibrium $R_0$ and the amplitude of the roller vibration decreases from said value 2*a*, corresponding to the maximum amplitude. When the eccentric is in position $E_2$, i.e. when the axis A of this eccentric has moved through a distance $A_1A_2 = a$, the eccentric does not cause further oscillatory movements of the roller about its position of equilibrium and the amplitude of the vibration thus produced is zero or minimum. Therefore, by moving the axis A of said eccentric E between positions $A_1$ and $A_2$ during the eccentric rotation it is possible to set the amplitude of the vibrations impressed to the apparatus between a maximum value and zero value. It will be seen that, should the eccentricity exceed the amplitude *a*, the same variation may be obtained from a roller position beyond the initial position of equilibrium, the maximum amplitude being controlled in all cases by the eccentricity of the driving eccentric, the variation acting upon the inherent frequency of the apparatus.

The means for controlling the movement of the axis of rotation of the excitation eccentric may be of any suitable and known type. However, according to a particularly advantageous form of embodiment of the invention, this control means may consist of another so-called positioning eccentric having its axis of rotation held against translation and connected to the axis of rotation of the excitation eccentric by means of an arm extending substantially in the direction contemplated for driving the apparatus to be vibrated, the excitation eccentric being rotatably driven through the medium of a suitable transmission from a motor rigid with a fixed support, said motor being coupled to the rotational shaft of the excitation eccentric by means of an arm extending normally to the arm coupling the excitation eccentric to the positioning eccentric. With this arrangement, it is clear that when the excitation eccentric is in the position nearest the roller, i.e. the position giving the maximum vibration amplitude, the arm connecting the positioning eccentric to the shaft of the excitation eccentric is also aligned with the direction of the pulses impressed to the apparatus, and therefore exactly at right angles to the arm connecting the excitation eccentric to the eccentric driving motor. When, as a consequence of the action exerted by this positioning eccentric, the rotational shaft of the excitation eccentric is pulled backwards, this shaft describes a circular arc centered to the axis of the pivotal connection between the motor and the arm coupling this motor to the shaft of the excitation eccentric, whereby the arm interconnecting the two eccentrics is no more directed exactly towards the apparatus (and therefore no more exactly normal to the arm connecting the shaft of the excitation eccentric to its driving motor), but since this variation in the drive angle is extremely small, its influence on the output of the vibrated apparatus is rather negligible.

Preferably, an irreversible device, such as a worm and wheel mechanism or gear, is associated with the positioning eccentric to prevent any accidental misadjustment of the selected amplitude.

In order to afford a clearer understanding of this invention and of the manner in which the same may be carried out in practice, reference will now be made to the accompanying drawings illustrating diagrammatically by way of illustration various forms of embodiment of the vibration generator according to this invention.

DESCRIPTION OF THE PREFERRED EMBODIMENTS

Figure 1:
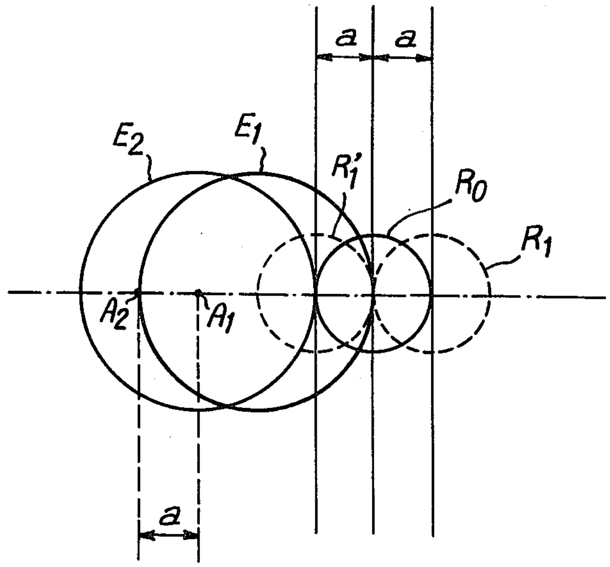
FIG. 1 is a schematic showing the positions of the roller for two positions of the eccentric.
Figure 2:
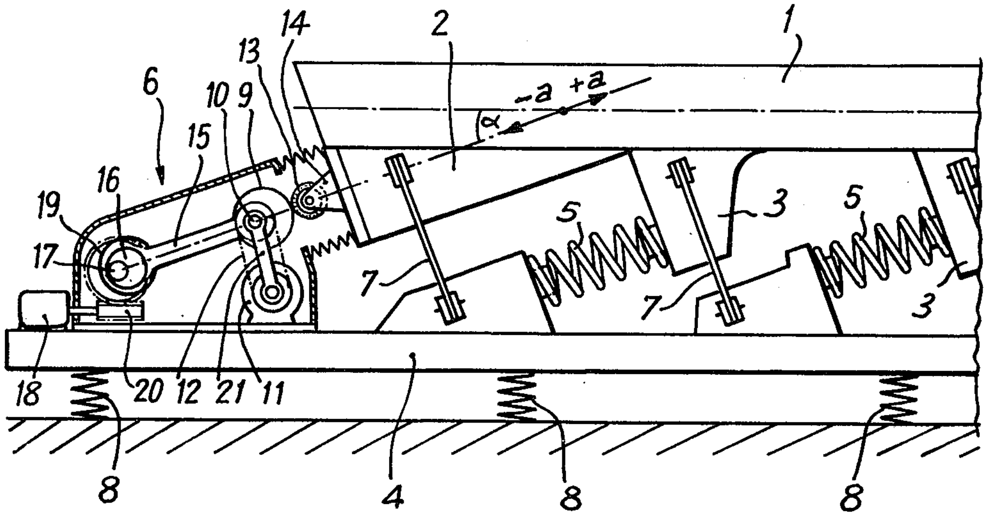
FIG. 2 is a diagrammatic side elevational and part-sectional view of a sprung trough or chute of the guided type, equipped with a vibration generator according to this invention which is secured to a resilient counter-mass.

Referring now to FIG. 2, illustrating diagrammatically a vibrating conveyor, the latter comprises a horizontal trough or chute 1 having its bottom rigidly secured at one end to a bracket 2 the bottom of which forms with the main dimension or longitudinal axis of the trough an angle $\alpha$ usually referred to as the drive angle; the value of $\alpha$ is selected with a view to obtain a maximum value of the rate of travel of the material or product along the trough 1. The bottom of trough 1 is also provided with depending extensions 3 connected to the horizontal bearing surface of a counter-mass 4 through working springs 5 so disposed as to form with the trough 1 the driving angle $\alpha$, the function of these springs consisting in storing up and releasing back the kinetic energy produced by the excitation torque received by said springs from the vibration generator 6, the assembly operating preferably in close vicinity of its resonance frequency. The reference numeral 7 designates spring blades connecting the trough 1 to the bearing surface of said counter-mass 4 and adapted to guide the trough oscillation in a direction parallel to said counter-mass 4. The bearing surface of counter-mass 4 is resiliently connected to the underlying ground or floor through other spring means 8 in order to damp out or absorb residual dynamic reactions.

The vibration generator 6 comprises an excitation eccentric 9 having its shaft 10 rotatably driven from a motor 11 through a belt and pulley transmission 12. The eccentric 9 is adapted, during its rotation, to engage a roller 13 of resilient material such as rubber, said roller 13 being secured by means of a yoke 14 to one end of bracket 2. The shaft 10 of eccentric 9 is connected through a rod 15 to the outer peripheral surface of another eccentric 16 constituting the positioning eccentric having its shaft 17 substantially aligned with the shaft 10 of eccentric 9 and with the roller 13, along the axis of said bracket 2. Said shaft 17 is operatively connected to an auxiliary motor 18 by means of a high-ratio, irreversible transmission, such as a worm and wheel gear 19, 20 affording an accurate control of the rotation of eccentric 16. Furthermore, the shaft 10 of eccentric 9 is connected by means of another arm 21 to the shaft of motor 11 so that, as shown in the Figure, the arms 15 and 21 form a right angle between them.

In operation, it is clear that when the positioning eccentric 16 is held against movement, the rotation of the excitation eccentric 9 is attended by the movement of roller 14 away from its position of equilibrium, whereby a vibration of predetermined amplitude depending on the distance from shaft 10 of the excitation eccentric 9 from roller 13 is impressed to the roller 13 and consequently to the trough 1, in order to set in motion the material contained in said trough. To vary this amplitude during operation, i.e. during the rotation of the excitation eccentric 9, the latter is simply moved towards or away from the roller 13 and for this purpose the rotation of the positioning eccentric 16 is controlled by means of the auxiliary motor 18, so that this eccentric 16 moves, by means of rod 15, the shaft 10 in relation to roller 13. Thus, when the positioning eccentric 16 is rotated clockwise, the shaft 10 of the excitation eccenctric 9 is pulled to the left as seen in the Figure, thus causing a corresponding decrement in the amplitude of the vibration impressed to the trough 1. It may be noted that during this movement the shaft 10 describes a circular arc centered to the point of pivotal connection between the shaft 21 and the motor 11, whereby the shaft 10 and roller 13 are no more exactly aligned with the axis of bracket 2, but this is immaterial for the movements impressed to said shaft 10 are very moderate and therefore the resulting slight misalignment is of negligible value.

It is also apparent that by associating a variable-speed gearing (not shown) with the motor 11, the frequency of the vibrations impressed to the trough 1 may be varied during the operation of the apparatus.

Figure 3:
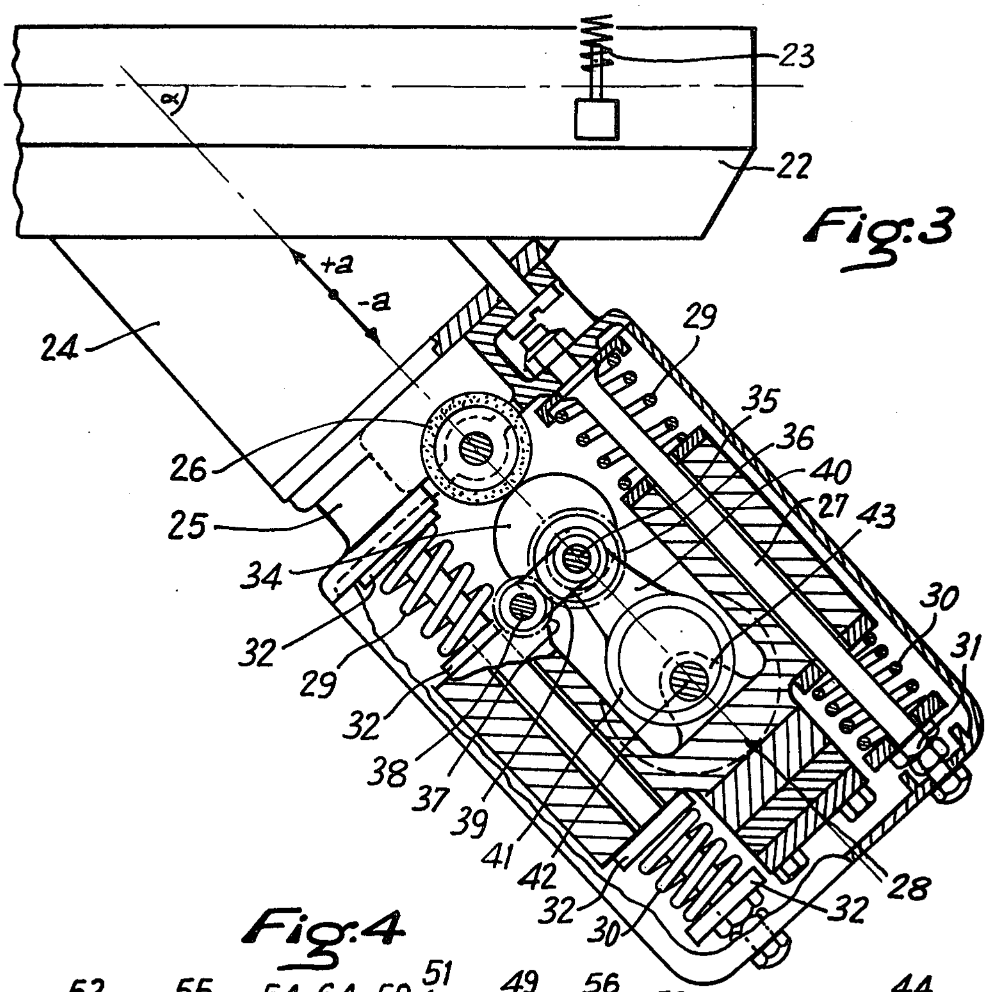
FIG. 3 is a view similar to FIG. 2 showing a vibrating apparatus of the sprung, double-mass type, equipped with a vibration generator according to this invention, which is rigid with a vibrated trough.

FIG. 3 illustrates another type of double-mass vibrating conveyor wherein the horizontal trough or chute 22, in which the material or product is caused to circulate, is suspended by means of springs 23 from a supporting surface (not shown). At one end the bottom of shoot 22 is rigid with a bracket 24 forming with the longitudinal axis of the shoot a working angle $\alpha$. Mounted to the end of said bracket 24 is a double-flanged carrier member 25 rotatably supporting a roller 26 having its outer peripheral surface lined with resilient material. Secured by one end to this carrier member 25 are at least two rods 27 on which an inertia weight 28 is slidably mounted between equal antagonistic coil compression springs 29, 30 disposed on one side between the carrier member 25 and the movable inertia weight 28, and on the other side between this inertia weight 28 and a double retaining nut screwed on the relevant rod 27. The springs 29, 30 engage concentric cups 32 enabling the movable inertia weight 28 to oscillate on either side of a position of equilibrium. This oscillation is provided for by the vibration generator comprising an excitation eccentric 34 adapted to co-act with said roller 26 and having its shaft 35 rotatably driven by a pinion 36 keyed on shaft 35 and in constant meshing engagement with another pinion 37 carried by a counter-shaft 38 revolving in a support rigid with said movable inertia weight 28 and coupled through an universal-joint or cardan shaft transmission to the output shaft of a motor (not shown). A link 39 connects the shaft 35 of the excitation eccentric 34 to the counter-shaft support 38. Moreover, said shaft 35 is connected through a rod 40 to another eccentric 41 constituting the positioning eccentric of the device, the shaft 42 of this eccentric 41 being rotatably mounted in a support 43 rigid with said movable inertia weight 28. The eccentric shaft 42 is coupled through another universal-joint shaft transmission to an auxiliary motor (not shown). The mutual engagement between the excitation eccentric 34 and the roller 26 causes the trough 22 to vibrate, this vibratory motion being sustained by the inherent resiliency of the working springs 29, 30, and, as already explained in the foregoing, mowing the excitation eccentric 34 towards or away from the roller 26 by means of the positioning eccentric 41 responsive to the auxiliary motor associated therewith will vary as desired, in actual operation, the amplitude of the vibration thus generated.

It will also be seen that according to an advantageous feature characterizing this invention an irreversible device adapted to prevent a misadjustment of the selected amplitude may be associated with the shaft 42 of the positioning eccentric 41. Moreover, as explained in the foregoing, a variable-speed gearing may be associated with the motor driving the excitation eccentric 34 for varying at will, during operation, the frequency of the vibration imparted to the trough 22. Finally, it will be seen that a cardan shaft transmission is contemplated between the shafts of eccentrics 34 and 41, on the one hand, and their driving motors, respectively, in order to reduce to zero the undesired effects produced by the vibration thus generated.

Figure 4:
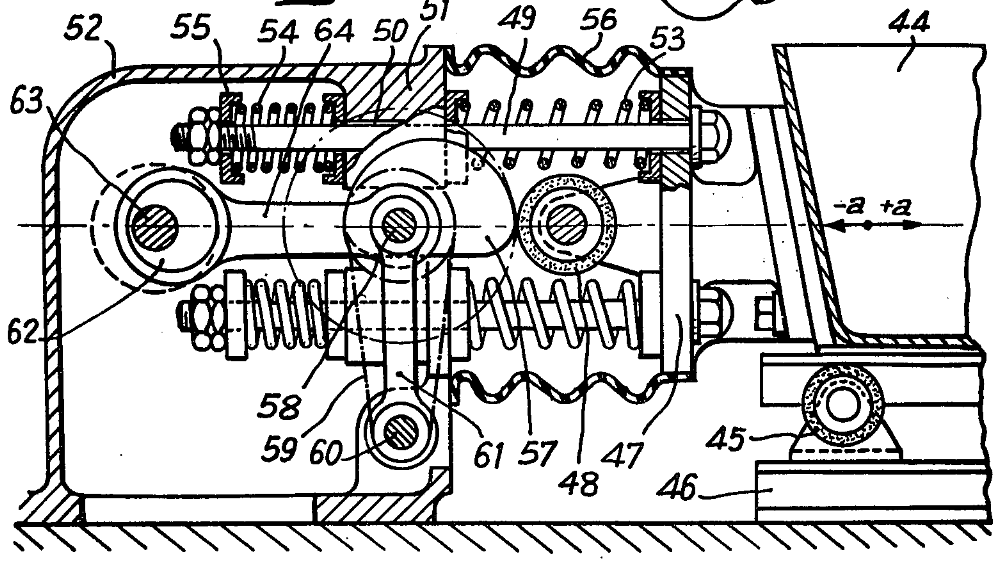
FIG. 4 is another view similar to FIGS. 2 and 3 showing an inertia apparatus equipped with a vibration generator according to this invention.

FIG. 4 illustrates a typical application of the vibration generator of this invention to the construction of an inertia-type vibrating conveyor. The conveyor trough or chute 44 is mounted on rubber-lined rollers 45 adapted to move to a limited extent along a horizontal bearing surface 46. At one end the trough 44 has bolted thereto a strap 47 carrying a roller lined with resilient material 48, the roller axis being disposed in the same plane as the axis of said trough 44. The strap 47 is rigid with a plurality of horizontal rods 49 slidably extending through apertures 50 formed in the front wall 51 of a casing 52. Surrounding these rods 49 are pairs of antagonistic equal working springs 53, 54 bearing on the one hand against said end wall 51 of casing 52 by means of cup washers 55 and on the other hand against the strap 47 and the free end of rod 49, respectively, also by means of cup washers 55. A flexible bellows 56 interconnects the front wall 51 of casing 52 and the strap 47. Rotatably mounted within the casing 52 is a cam 57 adapted, as will be explained presently, to engage during one portion of its movement the roller 48 mounted in said strap 47. The shaft 58 of said cam 57 is rotatably driven via a belt and pulley transmission 59 by the output shaft 60 of a motor (not shown). The shaft 58 of cam 59 is connected through a pivoting arm 61 to the driving motor shaft 60. Moreover, said shaft 58 is connected via connecting-rod 64 to an eccentric 62 having its shaft 63 rotatably driven from an auxiliary motor (not shown) and associated with an irreversible drive, for example a worm and wheel gear (also not shown in the drawing). As clearly illustrated in FIG. 4, the shafts 63 and 58 of eccentric 62 and cam 57 respectively are substantially aligned with the main axis of the trough 44.

In operation when the solid portion of cam 57 engages the roller 48 the shoot 44 is imparted a movement of translation to the right as seen in the Figure, the amplitude of this movement having the highest possible value and a sufficiently reduced speed so that the material supported by the trough 44 will adhere thereto (this system operates well below the resonance frequency). Subsequently, the truncated portion of the cam contour permits, with the assistance of spring means, the return stroke of trough 44 to its initial position at a speed high enough to separate the material from the trough, this material resuming its contact with the trough only during the next stroke thereof to the right, as seen in the drawing, whereby the material is caused to travel along the trough.

When during the operation of the apparatus it is desired to modify the amplitude of the stroke impressed to the trough, the cam 57 is moved towards or away from the roller 48 by actuating the eccentric 62 by means of its auxiliary driving motor. As already explained in the foregoing, associating a variable speed gearing with the motor driving the cam 57 will permit of adjusting at will, while the apparatus is in operation, the frequency of the vibration applied to said trough 44.

Figure 5:
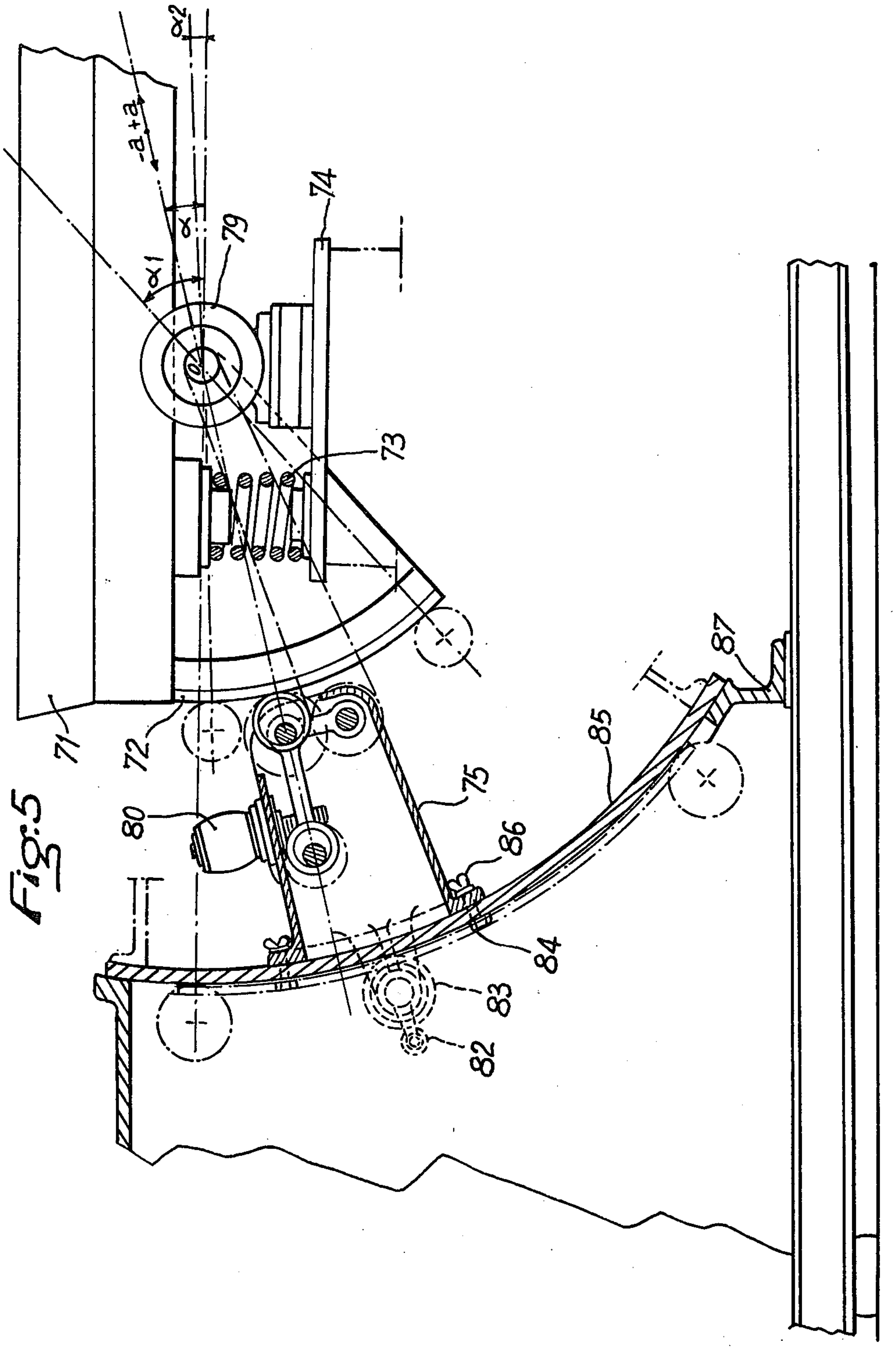
FIG. 5 is a diagrammatic side-elevational and part-sectional view showing a resilient trough or chute equipped with a vibration generator according to this invention which is adapted to rotate about an axis coincident with the center of gravity of the vibrated trough or chute through a driving angle $\alpha$ adjustable at will.

FIG. 5 illustrates the application of the generator of vibrations adjustable for frequency and amplitude during its operation, of this invention, in the case of a vibrating conveyor comprising a horizontal conveyor trough 71 having its bottom rigidly secured to one end of a bracket 72 of substantially cylindrical configuration, the radius of this bracket passing through the center of gravity 0 of the resilient trough 71.

The bottom of this trough 71 is supported by spring means 73 bearing on the floor by means of a frame structure 74. A vibration generator 75 according to this invention receives an excitation frequency from a motor and reduction gearing unit 79 of which the axis merges into the center of gravity of the resilient trough 71 in the inoperative condition thereof.

A motor 80 for adjusting the vibration amplitude during the actual operation of the apparatus is secured to the frame structure 87 and movable bodily therewith. The vibration generator 75 is movable along a circular segment 85 centered to 0. This movement may be performed either manually or automatically by using a crank handle 82 or an irreversible motor and reduction gearing unit driving the pinion 83 in meshing engagement with a concentric arcuate rack 84. Means such as bolts 86 carried by the frame structure 87 may be provided for locking the generator 75 in case of manual adjustment, in the inoperative condition of the apparatus. Thus, the vibration generator 75 may easily be positioned with the best possible working or driving angle $\alpha$.

Therefore, with this specific arrangement of the vibration generator it is possible, while in operation, to vary at will the vibration amplitude, frequency and working angle $\alpha$.

Figure 6:
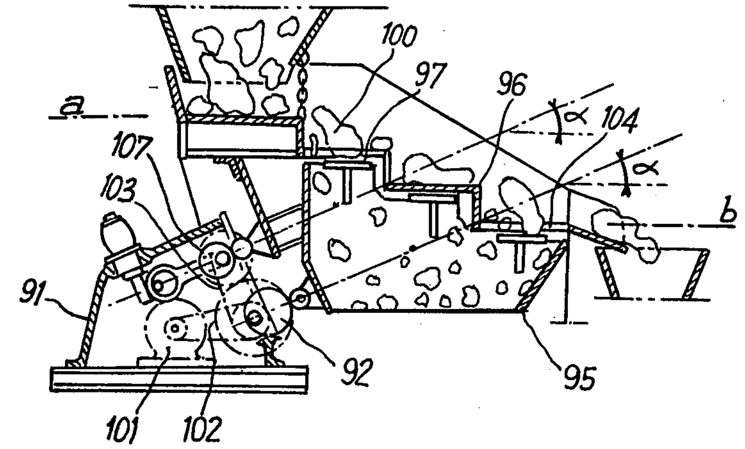
FIG. 6 is a diagrammatic sectional view showing on a smaller scale a preliminary screen with its fish-sorting grid, equipped with a vibration generator according to the instant invention, adapted to vibrate the two resilient masses simultaneously.
Figure 7:
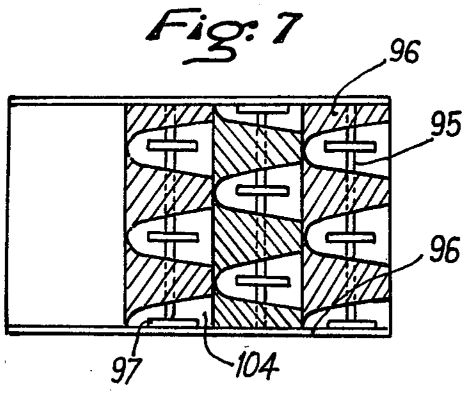
FIG. 7 is a horizontal section performed along line *a—b* of FIG. 6.

FIGS. 6 and 7 illustrate another form of embodiment of the vibration generator 91 according to this invention, to which an additional eccentric 92 called the "gudgeon-removing" eccentric.

This eccentric 92 is driven for rotation from a motor and reduction gearing unit 101 via a set of pulleys 102. The excitation eccentric 107 is rotatably coupled to said eccentric 92 by means of another set of pulleys 103.

The rotational velocities of the pair of eccentrics 92 and 107 are in the ratios of 1,  ,  , $1/n$ to each other, these ratios determining the gudgeon-removing frequency as a function of the characteristics of the treated product.

Figure 8:
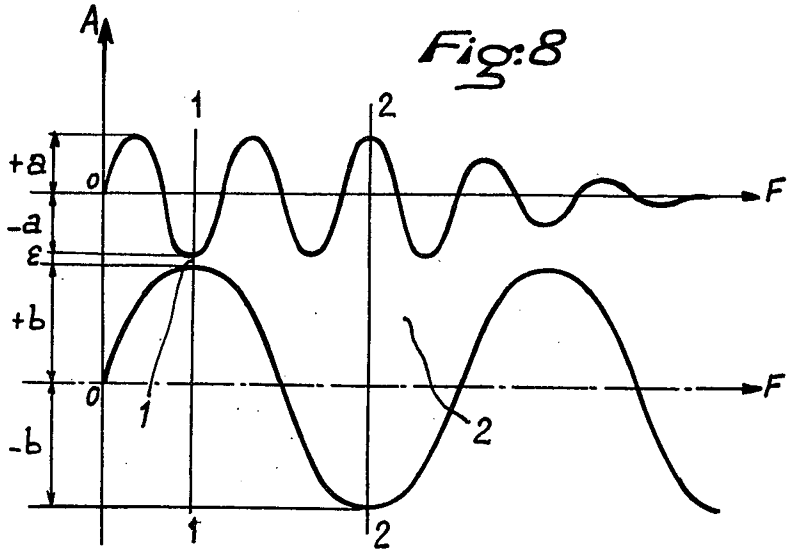
FIG. 8 illustrates two diagrams of the strokes accomplished by the preliminary screen and by its gudgeon-removing or sorting grid, respectively.

FIGS. 6, 7 and 8 illustrate by way of non-limiting example a vibration generator according to this invention, adapted to impart vibrations to a preliminary screen 96 at a frequency F and an amplitude $2a$ with a driving angle $\alpha$, and a gudgeon-removing grid 95 at a frequency F/2 and an amplitude $4a$ with the same driving angle $\alpha$.

In order to afford a clearer understanding of the simultaneous operation of said preliminary screen 96 and gudgeon-removing grid 95, there is shown in FIG. 8 the corresponding diagrams of the strokes obtained from the vibratory movements generated by the vibration generator 91 with the frequences and amplitude values selected in the specific ratios of   and 2.

It will be seen that the gudgeon-removal takes place in a first area 1, the plate 97 of grid 95 being set as close as possible to the aperture 104 of preliminary screen 96 and causing the fish 100 to tilt, so that this fish will be cleared from the grid of the preliminary screen 96.

In the next area 2 of the diagram of FIG. 8 the grid 95 is moved away from the peliminary screen 96 and the coarser elements of the material to be sorted can proceed easily.

The grid 96 illustrated in top plane view in FIG. 7 and sectional view in FIG. 6 is still cleared by the gudgeon-removing grid 95.

Of course, it would not constitute a departure from the basic principles of the present invention to utilize the vibration generator of this invention for clearing in operation the sieve wire-gauze by using as a gudgeon-removing grid another wire-gauze consisting of a series of saw-tooth blades of which each tooth is adapted to penetrate into the center of the corresponding mesh of the sieve wire-gauze.

The vibratory motion imparted to these two wire-gauzes disposed at 180° and adjusted as explained in the case of a staircase-type sorting screen permits of releasing the grains or other solid particles retained in the wire mesh. It will be seen that the clearing action is always a positive one, in contrast with hitherto known ball systems of which the clearing action is all but reliable.

It will also be understood by those conversant with the art that the above description is given by way of example and should not be construed as limiting the scope of the invention, since many modifications and variations may be brought thereto without departing from the basic principles of the invention as set forth in the appended claims.

What is claimed is:

1. A vibration generator, of which the amplitude is adjustable during operation, for driving at a predetermined angle a vibration apparatus having first and second relatively movable elements, said generator comprising:

i. a roller of resilient material mounted for free rotation on a support rigid with said first element of the vibration apparatus
   ii. resilient means disposed between said first element and said second element
   iii. an excitation eccentric rotatable about a shaft and positioned to abut said roller as a result of rotary oscillation along a line at said predetermined angle with respect to a longitudinal axis of said first element
   iv. motor means connected through transmission means to said excitation eccentric for driving said eccentric in rotation about said shaft
   v. a first arm connecting said motor means to said shaft of the excitation eccentric
   vi. a second arm connected at one end to said shaft of the excitation eccentric, said second arm being positioned with its longitudinal axis at said predetermined angle with respect to the longitudinal axis of the first element and being substantially at a right angle to said first arm, and vii. control means mounted on said second element and connected to the other end of said second arm to move said second arm, and said shaft of the excitation eccentric towards and away from said roller to vary the amplitude of vibration of the first element.

2. A vibration generator, according to claim 1, in which said control means comprises a positioning eccentric rotatably mounted on the second element and coupled to said second arm, and a second motor means coupled to said positioning eccentric for driving said eccentric in rotation.

3. A vibration generator, as claimed in claim 2, wherein said second motor means is connected to said positioning eccentric by a worm and worm wheel assembly.

4. In combination, a grid for clearing a screen, and a vibration generator as claimed in claim 3, said vibration generator having its excitation eccentric shifted by 180° and frequencies and amplitudes in the ratios of $n$ and $1/n$.

5. The combination of claim 4, further comprising a plurality of contact plates adapted to clear the apertures of the grid to be cleaned, during the operation of the apparatus.

6. A vibration generator, as claimed in claim 2, wherein the axis of the positioning eccentric, the axis of the excitation eccentric, and the axis of the vibrated roller are all disposed on a straight line which forms a predetermined angle with the longitudinal axis of the first element.

7. A vibration generator, as claimed in claim 2, wherein the excitation eccentric is coupled to a movable inertia weight resiliently mounted between opposed equal springs and is adapted to generate a vibratory motion imparted to the first element as a consequence of the combined action of said excitation eccentric and said resilient roller mounted at an end of said first element.

8. A vibration generator, as claimed in claim 7, wherein the torque from the first motor means is transmitted through a universal transmission to a countershaft connected to said excitation eccentric, the shaft of the positioning eccentric being also connected to the output shaft of said auxiliary motor means through a universal transmission.

9. A vibration generator, as claimed in claim 7, comprising a variable speed gearing connecting said motor means and said excitation eccentric to permit variation of the frequency of the vibrations imparted to said eccentric.

10. A vibration generator, as claimed in claim 2, wherein said excitation eccentric comprises a cam member having a contour adapted to impart, to a trough forming said first element, a forward stroke of relatively high amplitude and a velocity low enough to permit the adherence of the material to be conveyed to the bottom of the trough, and a relatively fast return stroke for causing the material to be detached from said bottom.

11. A vibration generator, as claimed in claim 2, wherein the first element is a trough of a conveyor, and wherein the generator is adapted to drive said trough in the direction of a main axis passing through a center of gravity of said trough with a driving angle $\alpha$ selected as a function of the operating characteristics of the trough.

12. A vibration generator, as claimed in claim 2, further comprising a clearing eccentric operating in parallel relationship to the working axis of said excitation eccentric with the same driving angle $\alpha$ but with a frequency which is a sub-multiple of the frequency of the excitation eccentric, and with an amplitude which is a multiple of the amplitude of the excitation eccentric.

* * * * *